United States Patent
Line et al.

(10) Patent No.: US 10,081,270 B1
(45) Date of Patent: Sep. 25, 2018

(54) FRONT SEAT SLEEPER SEAT AND FEATURES

(71) Applicant: Ford Global Technologies, LLC, Dearborn, MI (US)

(72) Inventors: Johnathan Andrew Line, Northville, MI (US); Marcos Silva Kondrad, Macomb, MI (US); Kevin Wayne Preuss, Berkley, MI (US); Daniel Ferretti, Commerce Township, MI (US); Keith Allen Godin, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/449,094

(22) Filed: Mar. 3, 2017

(51) Int. Cl.
| | |
|---|---|
| B60N 2/02 | (2006.01) |
| B60N 2/48 | (2006.01) |
| B60N 2/16 | (2006.01) |
| B60N 2/44 | (2006.01) |
| B60N 2/22 | (2006.01) |
| B60N 2/00 | (2006.01) |
| B60N 2/90 | (2018.01) |
| B60N 2/882 | (2018.01) |

(52) U.S. Cl.
CPC .......... *B60N 2/0244* (2013.01); *B60N 2/002* (2013.01); *B60N 2/16* (2013.01); *B60N 2/22* (2013.01); *B60N 2/4495* (2013.01); *B60N 2/4879* (2013.01); *B60N 2/882* (2018.02); *B60N 2/995* (2018.02); *B60N 2002/0268* (2013.01)

(58) Field of Classification Search
CPC .......... B60N 2/0244; B60N 2/22; B60N 2/16; B60N 2/002; B60N 2/4879; B60N 2/4495; B60N 2/995
USPC .......................................... 297/217.1, 354.13
See application file for complete search history.

(56) References Cited

U.S. PATENT DOCUMENTS

| | | | |
|---|---|---|---|
| 2,576,343 | A | 11/1951 | Hibbard et al. |
| 2,797,739 | A | 7/1957 | Orsini |
| 3,451,261 | A | 6/1969 | Olsen |
| 4,106,081 | A | 8/1978 | Turturici |

(Continued)

FOREIGN PATENT DOCUMENTS

| | | |
|---|---|---|
| DE | 19901072 C1 | 3/2000 |
| DE | 102005023602 A1 | 11/2006 |

(Continued)

*Primary Examiner* — Anthony D Barfield
(74) *Attorney, Agent, or Firm* — Vichit Chea; Price Heneveld LLP (57) ABSTRACT

A seating assembly for a vehicle includes a seat having an extendable leg support. A seatback is operably coupled with the seat. The seating assembly includes an occupant detection system. A rear seat lift device is disposed in the seat and operable between a lowered position and a heightened position. A rear portion of the seat is elevated relative to the seatback to minimize a height difference between the rear portion of the seat and a bottom portion of the seatback when the seatback is in a fully reclined position. A control module is in communication with the occupant detection system, the seat, and the seatback. The control module is configured to activate an actuation assembly of the seatback to rotate the seatback rearward, extend the extendable leg support forward, and raise the rear seat lift device to provide optimal rest conditions for the occupant.

20 Claims, 8 Drawing Sheets

(56) References Cited

U.S. PATENT DOCUMENTS

| | | | |
|---|---|---|---|
| 4,272,119 A | 6/1981 | Adams | |
| 4,506,317 A | 3/1985 | Duddy | |
| 4,626,028 A | 12/1986 | Hatsutta et al. | |
| 4,709,961 A | 12/1987 | Hill | |
| 4,809,897 A | 3/1989 | Wright, Jr. | |
| 4,832,400 A | 5/1989 | Aoki et al. | |
| 4,955,571 A | 9/1990 | Lorence et al. | |
| 4,977,973 A | 12/1990 | Takizawa | |
| 5,011,225 A | 4/1991 | Nemoto | |
| 5,011,226 A | 4/1991 | Ikeda et al. | |
| 5,046,433 A | 9/1991 | Kramer et al. | |
| 5,058,953 A | 10/1991 | Takagi et al. | |
| 5,092,507 A | 3/1992 | Szablak et al. | |
| 5,145,233 A | 9/1992 | Nagashima | |
| 5,297,010 A | 3/1994 | Camarota et al. | |
| 5,364,164 A | 11/1994 | Kuranami | |
| 5,370,035 A | 12/1994 | Madden, Jr. | |
| 5,511,842 A | 4/1996 | Dillon | |
| 5,521,806 A | 5/1996 | Hutzel et al. | |
| 5,567,011 A | 10/1996 | Sessini | |
| 5,732,994 A | 3/1998 | Stancu et al. | |
| 5,836,648 A | 11/1998 | Karschin et al. | |
| 5,845,965 A | 12/1998 | Heath et al. | |
| 6,015,198 A | 1/2000 | Stair | |
| 6,032,587 A | 3/2000 | Salenbauch et al. | |
| 6,090,148 A | 7/2000 | Weber et al. | |
| 6,096,086 A | 8/2000 | Weber et al. | |
| 6,110,216 A | 8/2000 | Weber et al. | |
| 6,123,377 A | 9/2000 | Lecher et al. | |
| 6,135,558 A | 10/2000 | Behrens et al. | |
| 6,135,561 A | 10/2000 | Kruger et al. | |
| 6,183,033 B1 | 2/2001 | Arai et al. | |
| 6,213,549 B1 | 4/2001 | Wieclawski | |
| 6,220,660 B1 | 4/2001 | Bedro et al. | |
| 6,273,511 B1 | 8/2001 | Wieclawski | |
| 6,347,590 B1 | 2/2002 | D'Annunzio et al. | |
| 6,419,314 B1 | 7/2002 | Scheerhorn | |
| 6,439,636 B1 | 8/2002 | Kuo | |
| 6,478,373 B1 | 11/2002 | Hake et al. | |
| 6,547,323 B1 | 4/2003 | Aitken et al. | |
| 6,565,150 B2 | 5/2003 | Fischer et al. | |
| 6,565,153 B2 | 5/2003 | Hensel et al. | |
| 6,601,901 B1 | 8/2003 | Schambre et al. | |
| 6,719,343 B2 | 4/2004 | Emerling et al. | |
| 6,719,367 B2 | 4/2004 | Mic et al. | |
| 6,719,368 B1 | 4/2004 | Neale | |
| 6,746,065 B1 | 6/2004 | Chan | |
| 6,761,388 B2 | 7/2004 | Lein et al. | |
| 6,848,817 B2 | 2/2005 | Bos et al. | |
| 7,021,694 B1 | 4/2006 | Roberts et al. | |
| 7,025,420 B2 | 4/2006 | Guinea Pena et al. | |
| 7,055,904 B2 | 6/2006 | Skelly et al. | |
| 7,077,472 B2 | 7/2006 | Steffens, Jr. | |
| 7,080,865 B2 | 7/2006 | Bergeron et al. | |
| 7,114,755 B1 | 10/2006 | Sturt et al. | |
| 7,192,070 B2 | 3/2007 | Radu et al. | |
| 7,270,452 B2 | 9/2007 | Wang | |
| 7,278,681 B2 | 10/2007 | Lilov et al. | |
| 7,293,507 B2 | 11/2007 | Depue et al. | |
| 7,296,839 B2 | 11/2007 | Scheerhorn | |
| 7,322,646 B2 | 1/2008 | Jammalamadaka et al. | |
| 7,328,818 B2 | 2/2008 | Prabucki | |
| 7,364,231 B2 | 4/2008 | Park et al. | |
| 7,393,052 B2 | 7/2008 | Humer et al. | |
| 7,431,365 B2 | 10/2008 | Sturt et al. | |
| 7,441,838 B2 | 10/2008 | Patwardhan | |
| 7,455,016 B2 | 11/2008 | Perin | |
| 7,520,552 B2 | 4/2009 | Nakamura et al. | |
| 7,523,888 B2 | 4/2009 | Ferry et al. | |
| 7,537,364 B2 | 5/2009 | Misawa et al. | |
| 7,641,252 B2 | 1/2010 | Sturt et al. | |
| 7,644,982 B2 | 1/2010 | Paluch | |
| 7,748,762 B2 | 7/2010 | Mayne, Jr. | |
| 7,770,953 B2 | 8/2010 | Koarai | |
| 7,793,597 B2 | 9/2010 | Bart et al. | |
| 7,798,072 B2 | 9/2010 | Becker et al. | |
| 7,834,750 B1 | 11/2010 | Hertz et al. | |
| 7,845,729 B2 | 12/2010 | Yamada et al. | |
| 7,857,381 B2 | 12/2010 | Humer et al. | |
| 7,934,762 B2 | 5/2011 | Hollenbeck et al. | |
| 8,002,323 B2 | 8/2011 | Jones et al. | |
| 8,033,610 B2 | 10/2011 | Graber et al. | |
| 8,052,194 B2 | 11/2011 | Sayama | |
| 8,104,836 B2 | 1/2012 | Little | |
| 8,109,565 B2 | 2/2012 | Waters et al. | |
| 8,141,930 B2 | 3/2012 | Sayama | |
| 8,167,366 B2 | 5/2012 | Charpentier et al. | |
| 8,177,281 B2 | 5/2012 | Sayama | |
| 8,201,890 B1 | 6/2012 | Nagoaka Mihara | |
| 8,262,164 B2 | 9/2012 | Ito et al. | |
| 8,287,024 B2 | 10/2012 | Sayama | |
| 8,287,037 B2 | 10/2012 | Sayama | |
| 8,336,955 B2 | 12/2012 | Sayama | |
| 8,388,054 B2 | 3/2013 | Sayama | |
| 8,397,963 B2 | 3/2013 | Singh | |
| 8,421,407 B2 | 4/2013 | Johnson | |
| 8,496,295 B2 | 7/2013 | Chen | |
| 8,528,978 B2 | 9/2013 | Purpura et al. | |
| 8,534,750 B2 | 9/2013 | Sayama | |
| 8,540,308 B2 | 9/2013 | Aoki et al. | |
| 8,899,683 B2 | 12/2014 | Ito | |
| 8,998,327 B2 | 4/2015 | Cooney | |
| 9,105,809 B2 | 8/2015 | Lofy | |
| 9,150,152 B2 | 10/2015 | Sura et al. | |
| 9,168,850 B2 | 10/2015 | Meszaros et al. | |
| 9,187,019 B2 | 11/2015 | Dry et al. | |
| 9,205,774 B2 | 12/2015 | Kennemer et al. | |
| 9,399,418 B2 | 7/2016 | Line et al. | |
| 9,421,894 B2 | 8/2016 | Line et al. | |
| 9,452,838 B2 | 9/2016 | Meister et al. | |
| 9,566,888 B2 | 2/2017 | Kolich et al. | |
| 9,573,502 B2 | 2/2017 | Seki et al. | |
| 9,596,940 B2 | 3/2017 | Petzel et al. | |
| 9,610,872 B2 | 4/2017 | Dry et al. | |
| 9,649,962 B2 | 5/2017 | Line et al. | |
| 2003/0036835 A1* | 2/2003 | Breed | G01S 15/04 |
| | | | 701/45 |
| 2004/0012234 A1 | 1/2004 | Yamaguchi et al. | |
| 2004/0070240 A1 | 4/2004 | Haland et al. | |
| 2005/0006939 A1* | 1/2005 | Hancock | B60N 2/0228 |
| | | | 297/354.12 |
| 2005/0120477 A1 | 6/2005 | Kennan | |
| 2005/0225145 A1 | 10/2005 | Furtado et al. | |
| 2005/0280296 A1 | 12/2005 | Ohchi et al. | |
| 2006/0006709 A1 | 1/2006 | Uno et al. | |
| 2006/0071517 A1 | 4/2006 | Humer et al. | |
| 2006/0100764 A1 | 5/2006 | Adams et al. | |
| 2006/0202524 A1 | 9/2006 | Yamaguchi | |
| 2006/0202525 A1 | 9/2006 | Yamaguchi | |
| 2006/0208517 A1 | 9/2006 | Nakamura et al. | |
| 2006/0217862 A1* | 9/2006 | Sakai | B60N 2/002 |
| | | | 701/45 |
| 2007/0170281 A1 | 7/2007 | Cooper et al. | |
| 2007/0205622 A1 | 9/2007 | Whitens et al. | |
| 2008/0012402 A1 | 1/2008 | Sekida | |
| 2008/0073950 A1 | 3/2008 | Ko | |
| 2008/0084098 A1 | 4/2008 | Humer et al. | |
| 2008/0088158 A1 | 4/2008 | Yokota et al. | |
| 2008/0110931 A1 | 5/2008 | Prabucki | |
| 2008/0129093 A1 | 6/2008 | Kim | |
| 2008/0231067 A1 | 9/2008 | Nagle | |
| 2009/0167066 A1 | 7/2009 | Mori et al. | |
| 2009/0174206 A1 | 7/2009 | Vander Sluis et al. | |
| 2009/0309398 A1 | 12/2009 | Niitsuma et al. | |
| 2010/0026060 A1 | 2/2010 | Niitsuma et al. | |
| 2010/0066135 A1 | 3/2010 | Humer et al. | |
| 2010/0066136 A1 | 3/2010 | D'Agostini | |
| 2010/0090505 A1 | 4/2010 | Tarusawa et al. | |
| 2010/0127540 A1 | 5/2010 | Park et al. | |
| 2010/0148545 A1 | 6/2010 | Omori | |
| 2010/0187875 A1 | 7/2010 | Sasaki et al. | |
| 2010/0201167 A1 | 8/2010 | Wieclawski | |
| 2010/0207414 A1 | 8/2010 | Tsuda et al. | |
| 2010/0244478 A1 | 9/2010 | Depue | |

(56) References Cited

U.S. PATENT DOCUMENTS

| | | |
|---|---|---|
| 2010/0264704 A1 | 10/2010 | Yasuda et al. |
| 2010/0270834 A1 | 10/2010 | Niitsuma |
| 2010/0270835 A1 | 10/2010 | Nitsuma |
| 2010/0295348 A1 | 11/2010 | Takayasu et al. |
| 2010/0308629 A1 | 12/2010 | Lee et al. |
| 2011/0187167 A1 | 8/2011 | Takayasu et al. |
| 2011/0272978 A1 | 11/2011 | Nitsuma |
| 2012/0068517 A1 | 3/2012 | Yetukuri et al. |
| 2012/0198616 A1 | 8/2012 | Makansi et al. |
| 2012/0212016 A1 | 8/2012 | Kanda |
| 2013/0153055 A1 | 6/2013 | Gaffoglio |
| 2014/0203615 A1 | 7/2014 | Little |
| 2014/0368015 A1 | 12/2014 | Basters et al. |
| 2016/0355114 A1 | 12/2016 | Line et al. |

FOREIGN PATENT DOCUMENTS

| | | |
|---|---|---|
| EP | 2769904 A1 | 8/2014 |
| FR | 2833220 A | 10/1938 |
| FR | 2698594 A1 | 6/1994 |
| JP | H0775608 A | 3/1995 |
| WO | 2006067460 A1 | 6/2006 |
| WO | 2010144420 A1 | 12/2010 |
| WO | 2016070052 A1 | 5/2016 |

\* cited by examiner

FRONT SEAT SLEEPER SEAT AND FEATURES

FIELD OF THE DISCLOSURE

The present disclosure generally relates to a seating assembly, and more particularly, to a front seat sleeper seat for a seating assembly.

BACKGROUND OF THE DISCLOSURE

Seating assemblies and the flexible nature of their construction is becoming more important in today's world. The value of having an adjustable seating assembly provides increased worktime and increased comfort to an individual. Some seating assemblies include upper thoracic support that is adjustable between forward and rearward positions. Providing an aesthetically pleasing upper back support that is consistent with and generally seamless with the remainder of the seat provides value to the consumer.

SUMMARY OF THE DISCLOSURE

According to one aspect of the present disclosure, a seating assembly for a vehicle includes a seat having an extendable leg support. A seatback is operably coupled with the seat. The seating assembly includes an occupant detection system. A rear seat lift device is disposed in the seat and operable between a lowered position and a raised position. A rear portion of the seat is elevated relative to the seatback to minimize a height difference between the rear portion of the seat and a bottom portion of the seatback when the seatback is in a fully reclined position. A control module is in communication with the occupant detection system, the seat, and the seatback. When the vehicle is in park and an occupant has been detected by the occupant detection system, the control module is configured to activate an actuation assembly of the seatback to rotate the seatback rearward, extend the extendable leg support forward, and raise the rear seat lift device to provide optimal rest conditions for the occupant.

According to another aspect of the present disclosure, in a seating assembly for a vehicle, a seat is operably coupled with a seatback. A method of operating a sleeper seat mode includes determining an occupancy status of the seating assembly. An actuation assembly of the seatback is activated, resulting in rotation of the seatback rearward. Extendable leg supports of the seat are extended in a forward direction. A rear seat lift device of the seat is raised to a raised position. A rear portion of the seat is elevated relative to the seatback to minimize a height difference between the rear portion of the seat and a bottom portion of the seatback to provide optimal rest conditions for the occupant.

According to yet another aspect of the present disclosure, a method of operating a sleeper seat mode for a seating assembly includes determining an occupancy status of the seating assembly. An actuation assembly of a seatback is activated to rotate the seatback rearward. Extendable leg supports of a seat are extended in a forward direction. A rear seat lift device of the seat is raised to minimize a height difference between a rear portion of the seat and a bottom portion of the seatback.

According to still another aspect of the present disclosure, a seating assembly includes an actuation assembly that allows the seatback to rotate rearward. The seating assembly includes a rear seat lift device of the seat that is raised to minimize a height difference between a rear portion of the seat and a bottom portion of the seatback. The rear seat lift increases the overall comfort of the seating assembly, particularly when the seatback of the seating assembly is rotated rearward to accommodate a better resting or sleeping posture of the occupant. Elevation of the rear seat lift better aligns the hips of the occupant with the lower back of the occupant, thereby minimizing or eliminating back pain to the occupant that might otherwise occur over an extended period of time.

Embodiments of the first aspect of the invention can include any one or a combination of the following features:
  removing a removable head restraint;
  sliding said seating assembly from a forward position to a rearward position;
  moving an upper thoracic cushion at an upper portion of the seatback from a retracted position to a deployed position;
  automatically, simultaneously rotating the seatback rearward, extending the extendable leg support forward, and raising the rear seat lift device;
  rotating a rotatable base of the extendable leg support outward and extending an extension member from the rotatable base; and
  prohibiting movement of said seating assembly to the sleeper seat mode when said vehicle is not in park.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
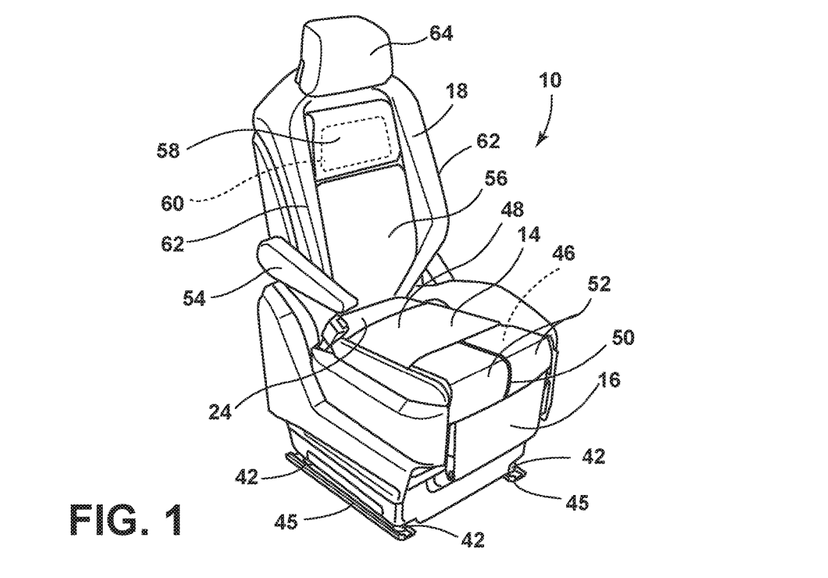
FIG. 1 is a top perspective view of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-11, reference numeral 10 generally designates a seating assembly for a vehicle 12 that includes a seat 14 having an extendable leg support 16. A seatback 18 is operably coupled with the seat 14. The seating assembly 10 includes an occupant detection system 20. A rear seat lift device 22 is disposed in the seat 14 and operable between a lowered position and a raised position. A rear portion 24 of the seat 14 is elevated relative to the seatback 18 to minimize a height difference between the rear portion 24 of the seat 14 and a bottom portion 26 of the seatback 18 when the seatback 18 is in a fully reclined position. A control module 30 is in communication with the occupant detection system 20, the seat 14, and the seatback 18. When the vehicle 12 is in park and an occupant has been detected by the occupant detection system 20, the control module 30 is configured to activate an actuation assembly 32 of the seatback 18 to rotate the seatback 18 rearward, extend the extendable leg support 16 forward, and raise the rear seat lift device 22 to provide optimal rest conditions for the occupant.

With reference to FIG. 1, the seating assembly 10 is generally constructed for use in a variety of environments, including residential or commercial applications, as well as in vehicles 12. The seating assembly 10 generally includes a seat base 40 supported on feet 42. The feet 42 may be operably coupled with a floor 44 of the vehicle 12. It will be understood that the feet 42 may be slidably coupled with the floor 44 via a rail slide assembly 45 or may maintain a stationary position relative to the floor 44 of the vehicle 12. The seat base 40 extends upwardly from the feet 42 and is configured to support a suspension assembly 46 and the seat 14. The seat 14 includes a cushion assembly 48 configured to provide comfort to an occupant. In addition, the seat 14 includes the rear portion 24 and a forward portion 50. The forward portion 50 may include independent thigh supports 52 configured to independently support each leg of an occupant. The seatback 18 is operably coupled with the seat 14 and is configured to pivot relative to the seat 14. In addition, the seatback 18 may include one or more seatback arms 54 pivotally coupled with the seatback 18. The seatback arms 54 provide support to the arms of an occupant. The seatback 18 includes a lower lumbar cushion 56 and an upper thoracic cushion 58. The upper thoracic cushion 58 is disposed proximate a paddle 60 that provides upper back support and which is adjustable between retracted and deployed positions. The seatback 18 also includes side bolsters 62 configured to cradle the sides of an occupant. A head restraint 64 is disposed on the seatback 18 and is operable between a plurality of vertical positions relative to the seatback 18.

Figure 2:
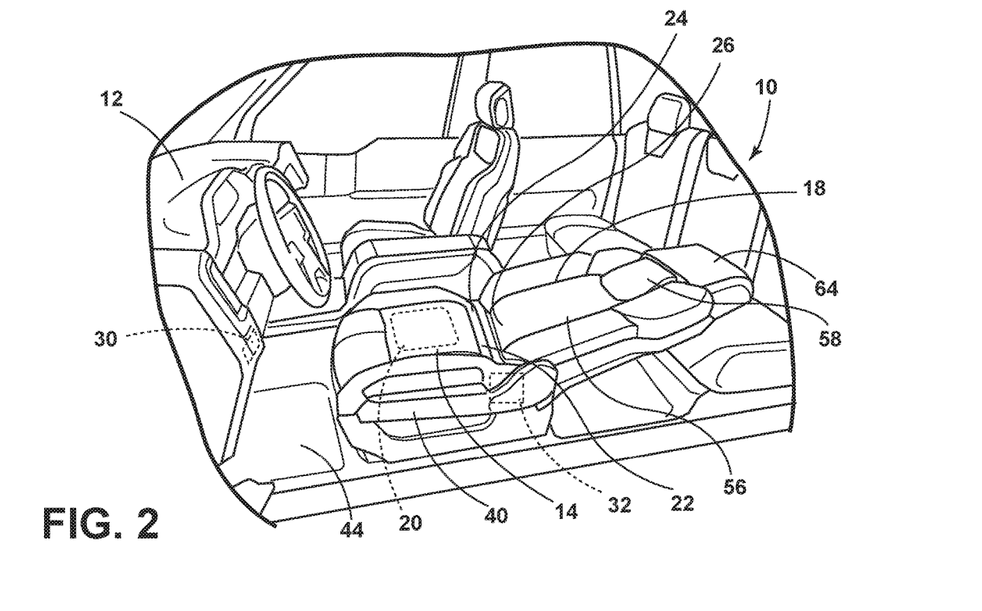
FIG. 2 is a top perspective view of a seating assembly of the present disclosure in a fully reclined position.

Referring again to FIGS. 1 and 2, the seating assembly 10 is generally configured to provide sleeping accommodations to an occupant. Accordingly, the seatback 18 is configured to pivot rearward relative to the seat 14, such that a cushion surface of the seat 14 and the seatback 18 are laterally aligned or nearly aligned (FIG. 2). In this configuration, by entering a sleeper seat mode controlled by the control module 30, the seating assembly 10 can provide comfort to an occupant that wishes to rest or sleep for a period of time without leaving the safety of the vehicle 12. In an effort to provide increased comfort and support to the upper back of an occupant, the paddle 60 can rotate upward (forward when the seatback 18 is vertically oriented) into abutting contact with an upper portion of the back of an occupant. This additional support lessens strain on the head and neck of the occupant. Additional comfort features are also disposed on the seating assembly 10 proximate the feet 42 and the buttocks of the occupant.

Figure 3:
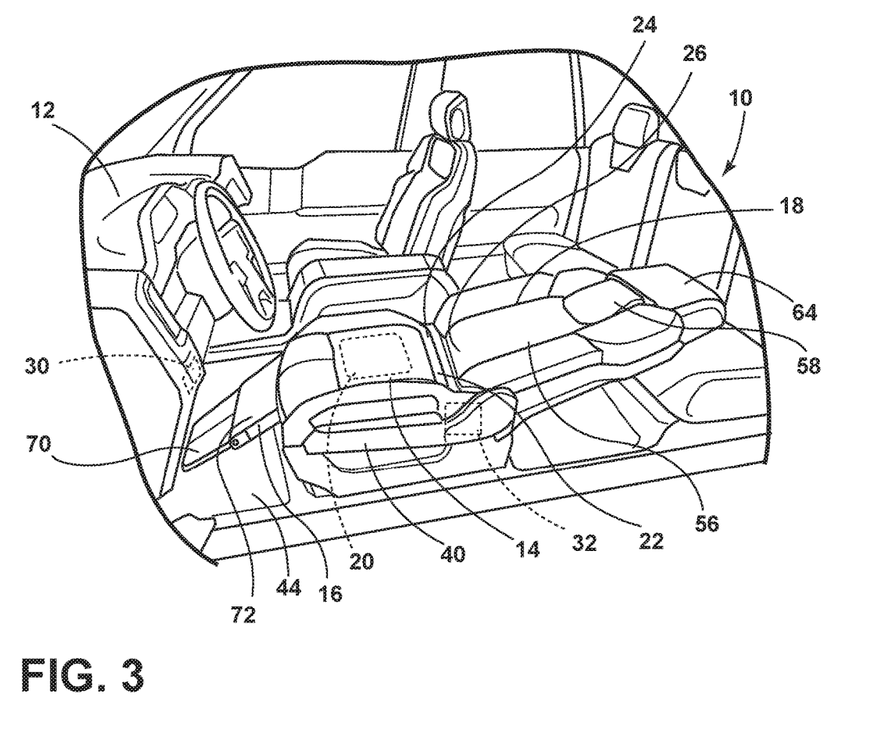
FIG. 3 is a top perspective view of a seating assembly of the present disclosure in a fully reclined position with a leg support in an extended position.

With reference again to FIGS. 1-3, the extendable leg support 16 is operable between extended and retracted positions. In FIG. 1, the extendable leg support 16 is shown in the retracted position. The extendable leg support 16 will typically be positioned in this manner when the occupant is driving the vehicle 12. However, if the seating assembly 10 is in the passenger seat, the extendable leg support 16 may assume this position in certain instances. When the extendable leg support 16 is in the retracted position, an inner extension 70 is received within a cavity or retracted to be adjacent to an outer rotatable base 72 of the extendable leg support 16. FIG. 3 illustrates the extendable leg support 16 in the extended position. In this instance, the inner extension 70 is moved to an outermost position relative to the outer rotatable base 72. In addition, the outer rotatable base 72 pivots upwardly and outwardly away from the seat base 40. Accordingly, when the extendable leg support 16 is in this position, the lower legs of the occupant can be supported, providing a more comfortable and relaxing condition for the occupant to rest.

Figure 4:
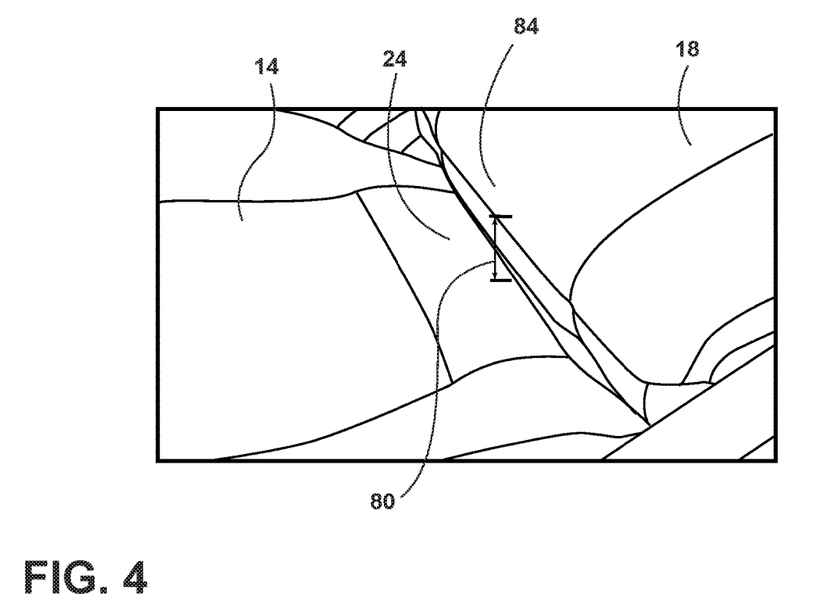
FIG. 4 is a partial top perspective view of a seating assembly of the present disclosure with a seat lift device in a lowered position.
Figure 5:
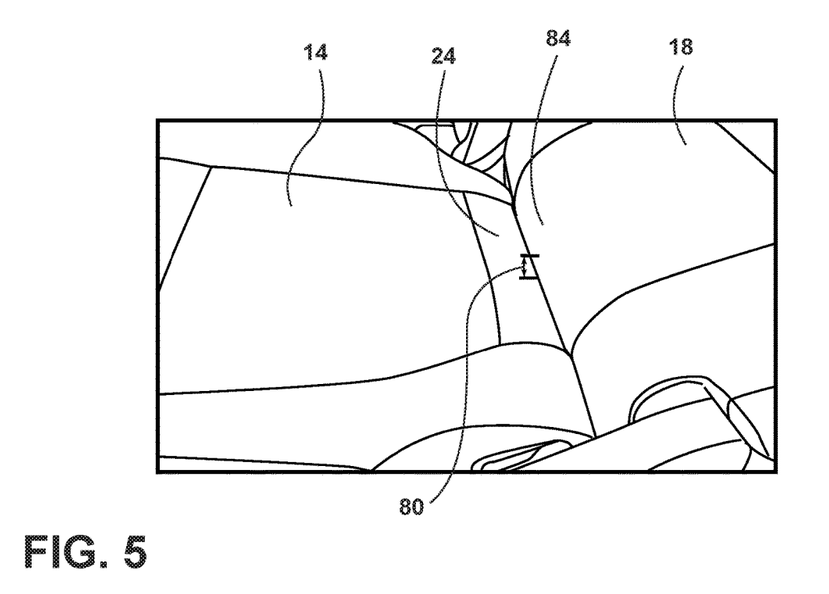
FIG. 5 is a partial top perspective view of a seating assembly of the present disclosure with the seat lift device in a raised position.

The seating assembly 10 also includes the rear seat lift device 22, as illustrated in FIGS. 4 and 5. In FIG. 4, the seat 14 is in a lowered position relative to the seatback 18. In the lowered position, a gap 80 is generally defined between the seat 14 and the seatback 18. The seat 14 may maintain the lowered position relative to the seatback 18 when the vehicle 12 is traveling or when the occupant desires the seatback 18 to be in a generally vertical orientation. However, the seat 14 is also operable to be moved to the raised position, as shown in FIG. 5. In this position, the rear portion 24 of the seat 14 is raised or elevated toward a bottom edge 84 of the seatback 18, thereby minimizing the size of the gap 80 that is otherwise located between the seat 14 and the seatback 18 (FIG. 4). As a result, any difference in height between the bottom edge 84 of the seatback 18 and the rear portion 24 of the seat 14 when the seatback 18 is in the fully reclined position is minimized, thereby providing minimal discomfort to the buttocks or lower back of the occupant. It will be understood that the rear seat lift device 22 may be an automated system that moves the seat 14 upward relative to the seatback 18 when the seatback 18 is moved to a fully reclined position. Alternatively, the rear seat lift device 22 may be manually adjusted, such that the occupant can dictate how high within the range of settings the seat 14 may be positioned relative to the seatback 18. In either instance, movement of the seat 14 relative to the seatback 18 from the lowered position to the raised position results in a more uniform height between the rear portion 24 of the seat 14 and the bottom edge 84 of the seatback 18.

Figure 6:
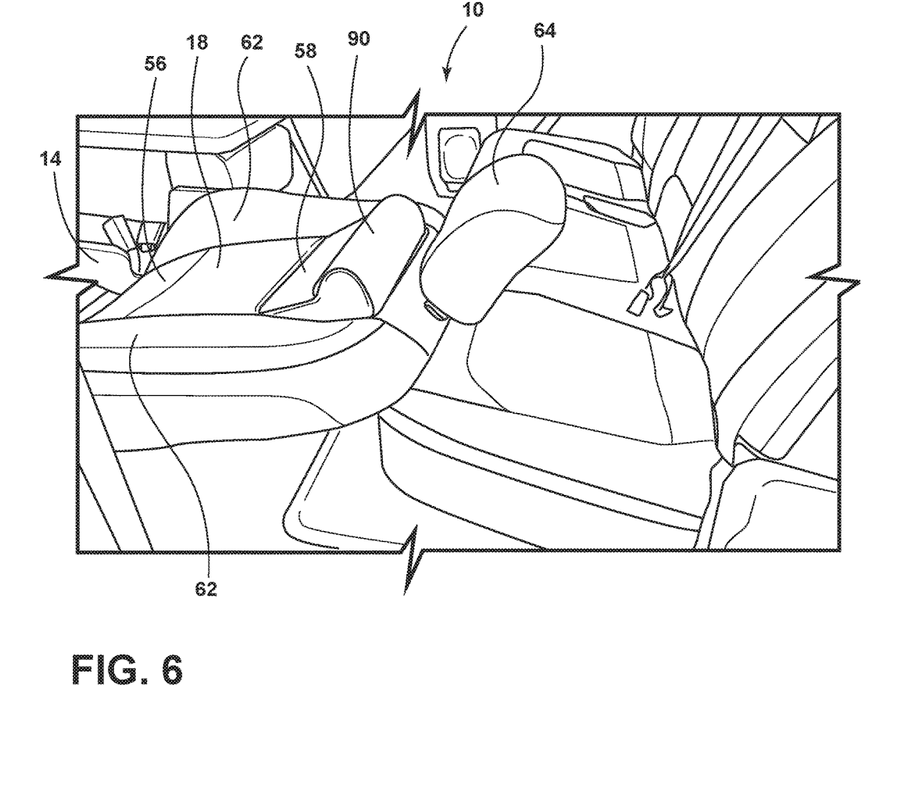
FIG. 6 is a top perspective view of a seatback of a seating assembly of the present disclosure with an upper back support in a deployed position.
Figure 7:
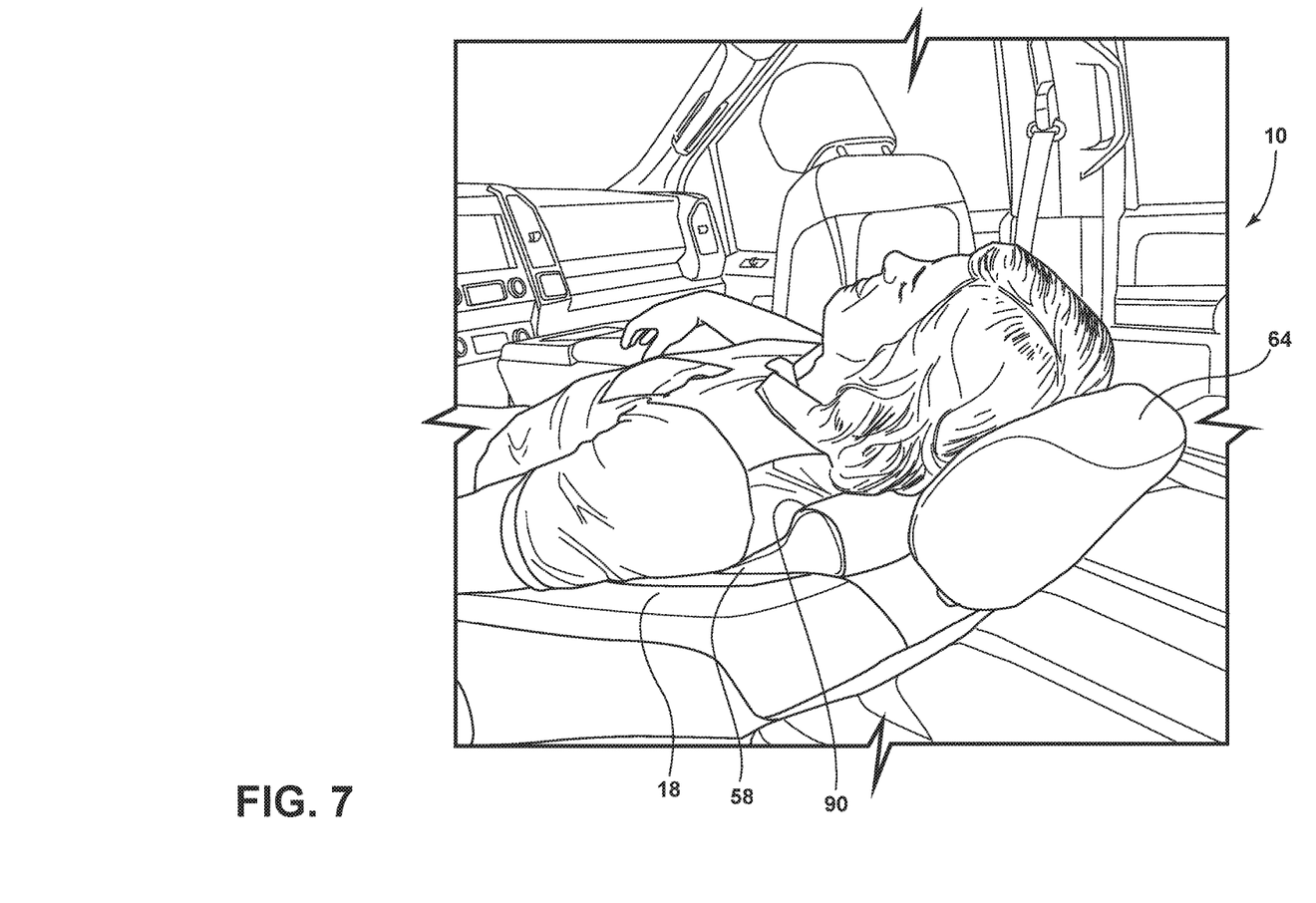
FIG. 7 is a top perspective view of a seating assembly of the present disclosure with the upper back support in a deployed position and an occupant laying thereon.

With reference now to FIGS. 6 and 7, the upper thoracic cushion 58 is shown with the paddle 60 adjusted to a deployed position. The deployed position may be available either automatically or manually, as desired by the occupant, to provide support to the upper back of the occupant when the occupant wishes to rest or otherwise recline. The upper thoracic cushion 58 includes a bulbous top portion 90 configured to engage the neck of the occupant and provide support thereto. The head restraint 64 is disposed above the upper thoracic cushion 58 and provides support to the head of the occupant when the occupant is rested against the upper thoracic cushion 58 and the paddle 60 is in the deployed position.

Figure 8:
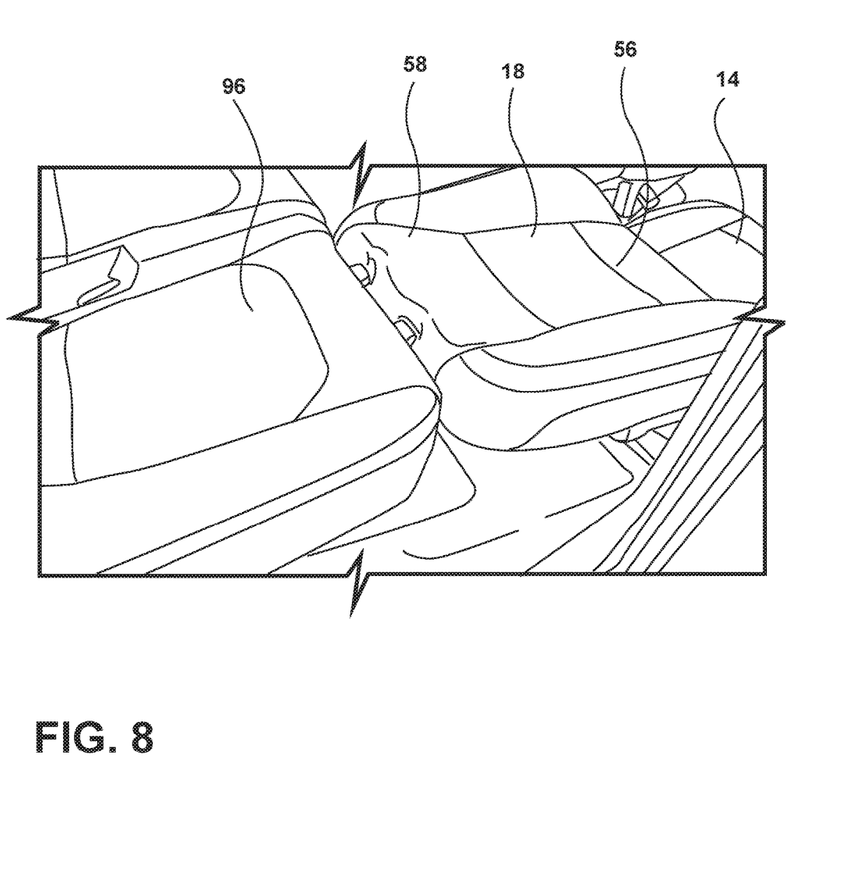
FIG. 8 is a top perspective view of a seating assembly of the present disclosure with the seatback in alignment with a rear seat of a vehicle.
Figure 9:
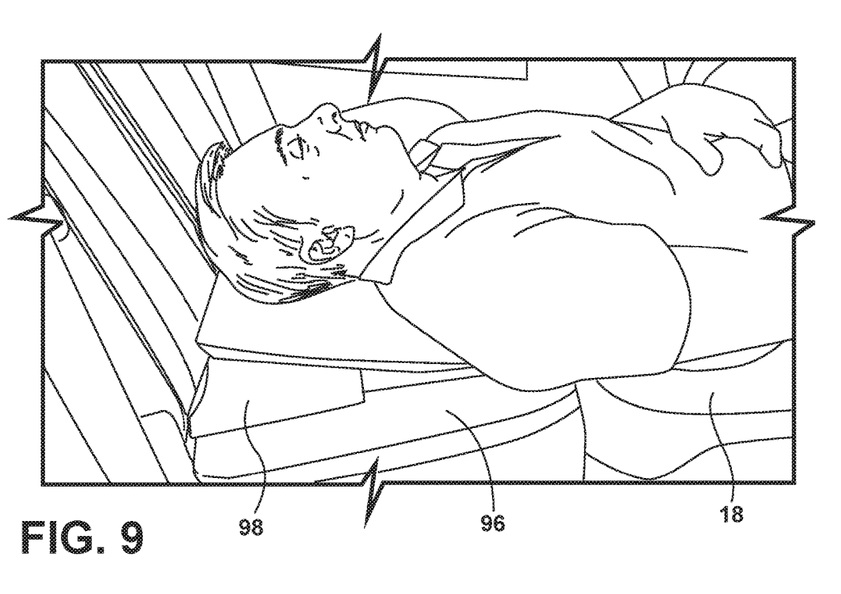
FIG. 9 is a top perspective view of a passenger laying across a front seat and into the rear seat of the vehicle.
Figure 10:
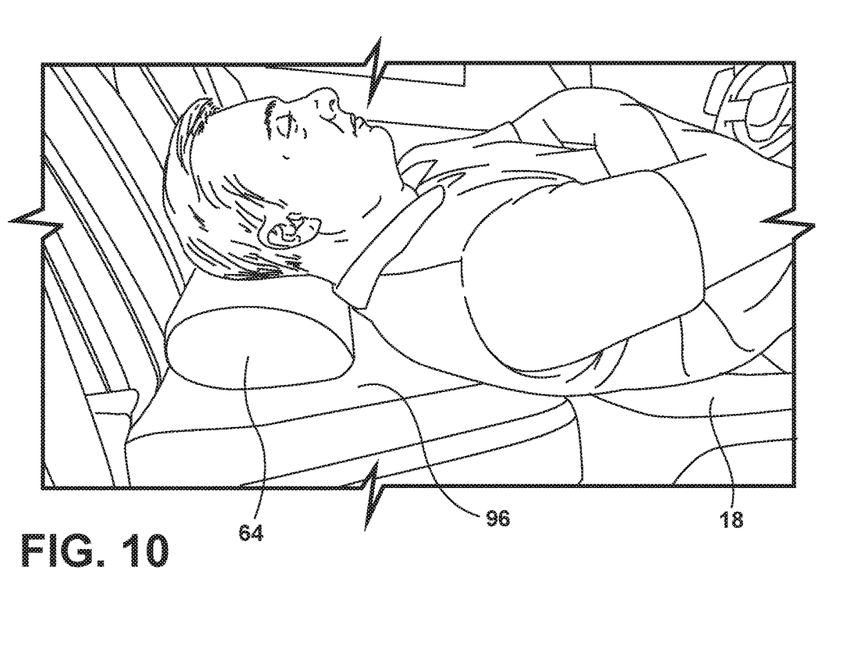
FIG. 10 is a top perspective view of a passenger laying across a front seat and into the rear seat of the vehicle.

With reference now to FIG. 8, the head restraint 64 can be removed and the seatback 18 moved to the fully reclined position. Although this view is of a passenger seat, it will be understood that the construction could be used in a driver's seat as well. In this instance, the seatback 18 may be generally aligned with a rear seat 96 of the vehicle 12. Accordingly, the rear seat of the vehicle 12 can provide support to the upper back of the passenger and the passenger can slide rearwardly over the seating assembly 10. The head restraint 64 may be positioned proximate the junction of the rear seatback 18 and the rear seat 96 to provide support to the head of the occupant. Alternatively, a pillow or other support member 98 could be used. It is generally contemplated that removal of the head restraint 64 may be automatic, wherein the head restraint 64 is discharged (via springs, levers, or the like) from posts in the upper seatback 18 onto the rear seat 96, or may be manually withdrawn from the seatback 18 and positioned by the occupant.

Figure 11:
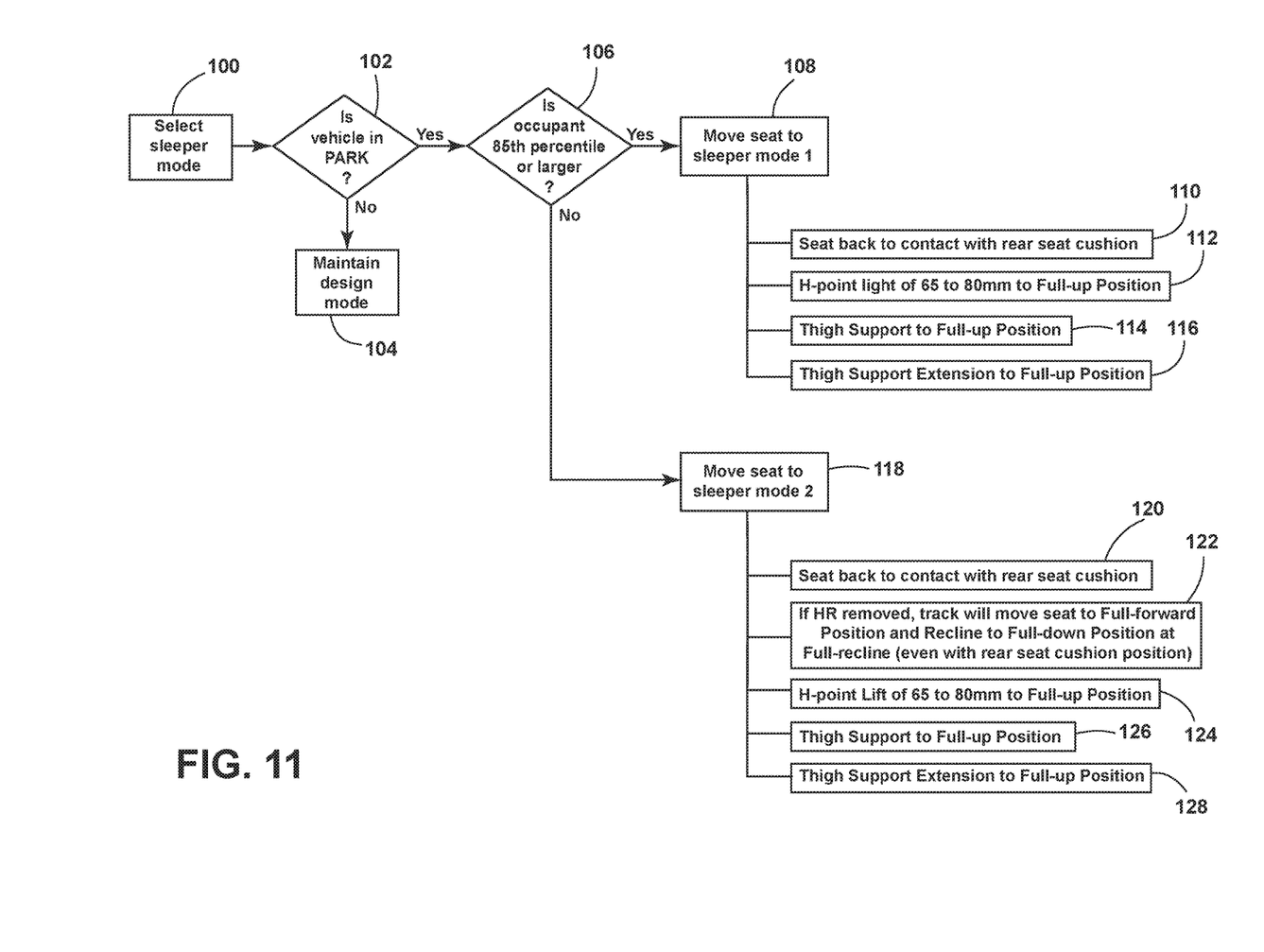
FIG. 11 is one example of a sleeper seat mode diagram illustrating logic of the sleeper seat mode.

With reference now to FIG. 11, logic for an exemplary sleep seat mode feature of the seating assembly 10 is illustrated. The control module 30 is configured to adjust the seating assembly 10 based on an instruction (step 100) to move to a sleeper seat position. This instruction may be in the form of a button, a switch lever, etc., selected by the occupant. If the control module 30 determines that the vehicle 12 is not in park (step 102), then a design mode (traditional upright position) of the seating assembly 10 is maintained (step 104). If the control module 30 determines that the vehicle 12 is in park, then the control module 30 operates to move the seating assembly 10 to a sleeper seat position. The sleeper seat position is generally determined based on the size of the occupant (step 106). The size of the occupant may be determined based on preset information entered by the occupant, or may be automatic based on a weight determined by the seating assembly 10 using an integrated scale or other similar device within the seating assembly 10. For occupants that meet or exceed the 85th percentile for weight, when the sleeper seat mode is selected by the occupant, sleeper mode 1 is activated (step 108) and the seatback 18 reclines the seatback 18 rearward into contact with a rear seat cushion (step 110). In addition, the rear seat lift device 22 is activated to adjust the rear portion 24 of the seat 14 so that a predefined hip point of the seating assembly 10 moves from a position between 65 and 80 mm to a position that is raised to align or closely align the seatback 18 (step 112). At the same time, the adjustable independent thigh supports 52 are raised to the fully raised position (step 114) and the extendable leg support 16 moves to a fully extended position (step 116). The seating assembly 10 will maintain this position until the occupant deselects the sleeper seat mode within the vehicle 12. While the seating assembly 10 is in the sleeper seat mode, the vehicle 12 cannot be shifted from park. However, once the seating assembly 10 has moved from the sleeper seat mode to a design position (regular use position) as desired by the occupant, the vehicle 12 can be moved from park to drive, reverse, etc.

If the occupant is below the 85th percentile (step 118), then upon selection of the sleeper seat mode, the seating assembly 10 will move the seatback 18 to contact the rear seat cushion (step 120). If the head restraint 64 is removed by the occupant or otherwise ejected automatically or manually by the seatback 18, the seating assembly 10 will move forward on the rail slide assembly 45 to a fully forward position (step 122). At the same time, the seatback 18 may recline to a fully reclined position. The predefined hip point will move from a position of between 65 to 80 mm to the raised position where the rear portion 24 of the seat 14 and the bottom edge 84 of the seatback 18 are laterally aligned (step 124). In addition, the independent thigh supports 52 are fully raised (step 126) and the extendable leg support 16 is extended (step 128). As with occupants that meet or exceed the 85th percentile, once the seating assembly 10 is placed in the sleeper seat mode, it is generally contemplated that the vehicle 12 will not leave the park mode. However, once the seating assembly 10 returns to the design position, the vehicle 12 can then be shifted from park mode to drive, reverse, etc.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly for a vehicle comprising:
   a seat including an extendable leg support;
   a seatback operably coupled with the seat;
   an occupant detection system;
   a rear seat lift device disposed in the seat and operable between a lowered position and a raised position, wherein a rear portion of the seat is elevated relative to the seatback to minimize a height difference between the rear portion of the seat and a bottom portion of the seatback when the seatback is in a fully reclined position; and
   a control module in communication with the occupant detection system, the seat, and the seatback, wherein when said vehicle is in park and an occupant has been detected by the occupant detection system, the control module is configured to activate an actuation assembly of the seatback to rotate the seatback rearward, extend the extendable leg support forward, and raise the rear seat lift device to provide optimal rest conditions for the occupant.

2. The seating assembly of claim 1, further comprising:
   a removable head restraint.

3. The seating assembly of claim 1, wherein said seating assembly is slidable between forward and rearward positions.

4. The seating assembly of claim 1, further comprising:
   an upper thoracic cushion disposed at an upper portion of the seatback and operable between retracted and deployed positions.

5. The seating assembly of claim 1, wherein the control module is configured to automatically, simultaneously rotate the seatback rearward, extend the extendable leg support forward, and raise the rear seat lift device.

6. The seating assembly of claim 1, wherein the extendable leg support includes a rotatable base and an extension member configured to extend from the rotatable base.

7. In a seating assembly for a vehicle a seat operably coupled with a seatback, a method of operating a sleeper seat mode comprising:
   determining an occupancy status of said seating assembly;
   activating an actuation assembly of said seatback resulting in rotation of said seatback rearward;
   extending extendable leg supports of said seat in a forward direction; and
   raising a rear seat lift device of said seat to a heightened position, wherein a rear portion of the seat is elevated relative to the seatback to minimize a height difference between the rear portion of the seat and a bottom portion of the seatback to provide optimal rest conditions for the occupant.

8. The method of claim 7, further comprising:
   removing a removable head restraint.

9. The method of claim 7, further comprising:
   sliding said seating assembly from a forward position to a rearward position.

10. The method of claim 7, further comprising:
    moving an upper thoracic cushion at an upper portion of the seatback from a retracted position to a deployed position.

11. The method of claim 7, further comprising:
    automatically, simultaneously rotating the seatback rearward, extending the extendable leg support forward, and raising the rear seat lift device.

12. The method of claim 7, further comprising:
    rotating a rotatable base of the extendable leg support outward and extending an extension member from the rotatable base.

13. The method of claim 7, further comprising:
    prohibiting movement of said seating assembly to the sleeper seat mode when said vehicle is not in park.

14. A method of operating a sleeper seat mode for a seating assembly comprising:
    determining an occupancy status of said seating assembly;
    activating an actuation assembly of a seatback to rotate said seatback rearward;
    extending extendable leg supports of a seat in a forward direction; and
    raising a rear seat lift device of said seat to minimize a height difference between a rear portion of the seat and a bottom portion of the seatback.

15. The method of claim 14, further comprising:
    removing a removable head restraint.

16. The method of claim 14, further comprising:
    sliding said seating assembly from a forward position to a rearward position.

17. The method of claim 14, further comprising:
    moving an upper thoracic cushion at an upper portion of the seatback from a retracted position to a deployed position.

18. The method of claim 14, further comprising:
    automatically, simultaneously rotating the seatback rearward, extending the extendable leg support forward, and raising the rear seat lift device.

19. The method of claim 14, further comprising:
    rotating a rotatable base of the extendable leg support outward and extending an extension member from the rotatable base.

20. The method of claim 14, further comprising:
    prohibiting movement of said seating assembly to the sleeper seat mode when said vehicle is not in park.

* * * * *